US009396843B2

(12) United States Patent
Chung et al.

(10) Patent No.: US 9,396,843 B2
(45) Date of Patent: Jul. 19, 2016

(54) METHOD OF MANUFACTURING A TRANSPARENT CONDUCTIVE LAYER AND TRANSPARENT CONDUCTIVE LAYER MANUFACTURED BY SAME

(75) Inventors: Kwang-Choon Chung, Yongin-Si (KR); Hyun-Nam Cho, Gunpo-si (KR); Nam Jung Kim, Uiwang-si (KR); Insook Yi, Daejeon (KR); Jung Ah Choi, Siheung-si (KR); Su Phil Kim, Siheung-si (KR)

(73) Assignee: Inktec Co., Ltd., Ansan-si (KR)

( * ) Notice: Subject to any disclaimer, the term of this patent is extended or adjusted under 35 U.S.C. 154(b) by 0 days.

(21) Appl. No.: 13/981,791

(22) PCT Filed: Jan. 26, 2012

(86) PCT No.: PCT/KR2012/000612
§ 371 (c)(1),
(2), (4) Date: Sep. 17, 2013

(87) PCT Pub. No.: WO2012/102556
PCT Pub. Date: Aug. 2, 2012

(65) Prior Publication Data
US 2014/0004371 A1    Jan. 2, 2014

(30) Foreign Application Priority Data
Jan. 26, 2011  (KR) ......................... 10-2011-0008000

(51) Int. Cl.
H01B 13/00    (2006.01)
C23C 18/08    (2006.01)
C09D 11/52    (2014.01)
H01B 1/02     (2006.01)

(52) U.S. Cl.
CPC ............ *H01B 13/0036* (2013.01); *C09D 11/52* (2013.01); *C23C 18/08* (2013.01); *H01B 1/02* (2013.01); *Y10T 428/12035* (2015.01)

(58) Field of Classification Search
CPC ...... C09D 11/52; H01B 13/0036; H01B 1/02; Y10T 428/12035
USPC ......................................... 427/123; 428/549
See application file for complete search history.

(56) References Cited

U.S. PATENT DOCUMENTS 6,712,998 B2    3/2004  Kato
(Continued)

FOREIGN PATENT DOCUMENTS

CN    101689568 A    3/2010
JP    2003213441 A    7/2003
KR    1999011487 A    2/1999
(Continued)

*Primary Examiner* — Dah-Wei D Yuan
*Assistant Examiner* — Jose Hernandez-Diaz
(74) *Attorney, Agent, or Firm* — The Webb Law Firm

(57) ABSTRACT

The present invention relates to a method of manufacturing a transparent conductive layer and a transparent conductive layer manufactured by the method. The method of manufacturing the transparent conductive layer includes: a) a step of forming a conductive nanowire layer on a base material; b) a step of thermally treating the conductive nanowire layer; c) a step of applying a conductive metal ink on the conductive nanowire layer; and d) a step of thermally treating the base material coated with the conductive metal ink to electrically bridge the conductive nanowires with each other by conductive metal particles of the conductive metal ink.

19 Claims, 1 Drawing Sheet

(56) References Cited

U.S. PATENT DOCUMENTS

| | | |
|---|---|---|
| 8,226,755 B2 | 7/2012 | Chung et al. |
| 2008/0206488 A1* | 8/2008 | Chung et al. .................. 427/596 |
| 2008/0259262 A1* | 10/2008 | Jones et al. .................. 349/139 |
| 2009/0068241 A1* | 3/2009 | Britz et al. .................... 424/409 |
| 2010/0182271 A1 | 7/2010 | Krier |
| 2011/0260115 A1* | 10/2011 | Kim et al. ..................... 252/503 |

FOREIGN PATENT DOCUMENTS

| | | |
|---|---|---|
| KR | 19990064113 A | 7/1999 |
| KR | 20000009405 A | 2/2000 |
| KR | 1020060090180 A | 8/2006 |
| KR | 1020060097271 A | 9/2006 |
| KR | 1020100017128 A | 2/2010 |
| KR | 1020100022904 A | 3/2010 |

* cited by examiner

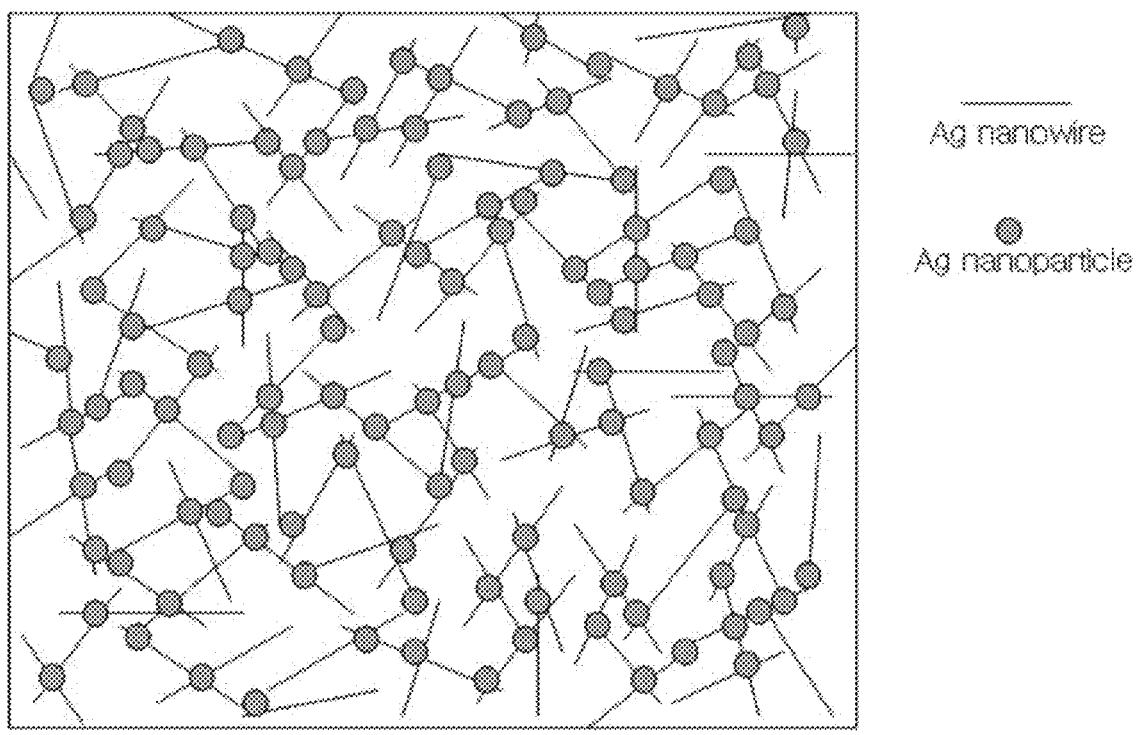

METHOD OF MANUFACTURING A TRANSPARENT CONDUCTIVE LAYER AND TRANSPARENT CONDUCTIVE LAYER MANUFACTURED BY SAME

CROSS-REFERENCE TO RELATED APPLICATIONS

This application is the United States national phase under 35 U.S.C. §371 of International Application No. PCT/KR2012/000612 filed Jan. 26, 2012, entitled "Method of Manufacturing a Transparent Conductive Layer and Transparent Conductive Layer Manufactured by Same", and claims priority under 35 U.S.C. §119(a)-(d) to Korean Patent Application No. 10-2011-0008000 filed on Jan. 26, 2011 in the Korean Intellectual Property Office, the disclosures of which are hereby incorporated by reference in their entirety.

TECHNICAL FIELD

The present invention relates to a method of manufacturing a transparent conductive layer having excellent conductivity, transmittance, flexibility, adhesion, and low haze by a simple process, and a transparent conductive layer manufactured by the same.

BACKGROUND ART

In general, a transparent conductive layer has been used as an essential component of electrical and electronic devices such as transparent electrodes in various display fields such as a display device for power supply, an electromagnetic shielding layer of home appliance, liquid crystal display (LCD), organic light emitting diode (OLED), field emission display (FED), plasma display panel (PDP), flexible display, and electronic paper, and as a material of the transparent conductive layer, an inorganic oxide conductive materials such as indium-tin oxide (ITO), antimony-tin oxide (ATO), antimony-zinc oxide (AZO), and the like, have been mainly used.

When the above-described materials are used to manufacture a transparent conductive layer by general methods such as a sputtering method, an ion-beam method, a vacuum depositing method, and the like, the transparent conductive layer may have high conductivity and excellent transmittance. However, equipment cost for the vacuum device is large and it is difficult to be mass-produced and size-increased, and in particular, there is a limitation in a transparent board such as a plastic film, requiring a low temperature process.

At the time of deposition by the sputtering process, a composition of the transparent layer is changed in accordance with conditions such as an oxygen partial pressure, temperature, and the like, such that transmittance and resistance of a thin film are rapidly changed.

Therefore, a method of using the transparent conductive layer manufactured by using a wet coating method such as a spin coating, a spray coating, a deposition coating, a printing, or the like, which is appropriate for low cost and mass-production to be coated, and performing a firing process, has been suggested, and for example, Korean Patent Laid-Open Publication No. 1999-011487 discloses a transparent conductive layer using a metal microparticle and a binder, Korean Patent Laid-Open Publication No. 1999-064113 discloses a composition for a transparent conductive layer prepared by adding tin oxide to a hollow carbonized microfiber, and Korean Patent Laid-Open Publication No. 2000-009405 discloses a coating solution for a transparent conductive light selective and absorbing film prepared by adding tin oxide or indium oxide to neodymium oxide. In addition, Japanese Patent No. 2003-213441 discloses a method of preparing a transparent conductive layer forming solution containing metal microparticles such as gold, silver, and the like.

However, in the transparent conductive layer prepared by the above-described method, surface resistance is high, and surface resistance is increased according to time by change in surrounding environment to have time dependency, such that initial conductivity may not be maintained. In addition, since the transmittance is low, there is a limitation as a transparent conductive layer, and productivity is deteriorated due to a number of complicated processes.

DISCLOSURE

Technical Problem

An object of the present invention is to provide a method of manufacturing a transparent conductive layer having excellent conductivity, transmittance, flexibility, adhesion, and low haze by a simple process, and a transparent conductive layer manufactured by the same.

Technical Solution

In one general aspect, the present invention is to provide a method of manufacturing a transparent conductive layer, the method including: a) forming a conductive nanowire layer on a base material; b) thermally treating the conductive nanowire layer; c) applying a conductive metal ink on the conductive nanowire layer; and d) thermally treating the base material applied with the conductive metal ink to electrically bridge the conductive nanowires with each other by conductive metal particles of the conductive metal ink.

In another general aspect, the present invention is to provide a method of manufacturing a transparent conductive layer, the method including: a) applying a conductive metal ink on a base material; b) thermally treating the base material applied with the conductive metal ink; c) forming a conductive nanowire layer on a surface to which the conductive metal ink is applied; and d) thermally treating the conductive nanowire layer to electrically bridge the conductive nanowires with each other by conductive metal particles of the conductive metal ink.

In another general aspect, the present invention is to provide a method of manufacturing a transparent conductive layer, the method including: a) forming a coating layer by applying a coating solution containing a conductive nanowire and a conductive metal ink on a base material; and b) thermally treating the coating layer to electrically bridge the conductive nanowires with each other by conductive metal particles of the conductive metal ink.

In another general aspect, the present invention is to provide a transparent conductive layer manufactured by the manufacturing method as described above.

Advantageous Effects

According to the present invention, there is provided a method of manufacturing a transparent conductive layer having excellent conductivity, transmittance, flexibility, adhesion, and low haze by a simple process, and a transparent conductive layer manufactured by the same.

DESCRIPTION OF DRAWINGS

FIG. 1 is a diagram showing a transparent conductive layer in which silver nanowires are bridged with each other by silver nano particles according to the present invention.

BEST MODE

A method of manufacturing a transparent conductive layer according to a first example of the present invention, the method may include: a) forming a conductive nanowire layer on a base material; b) thermally treating the conductive nanowire layer; c) applying a conductive metal ink on the conductive nanowire layer; and d) thermally treating the base material coated with the conductive metal ink to electrically bridge the conductive nanowires with each other by conductive metal particles of the conductive metal ink.

A method of manufacturing a transparent conductive layer according to a second example of the present invention, the method may include: a) applying a conductive metal ink on a base material; b) thermally treating the base material applied with the conductive metal ink; c) forming a conductive nanowire layer on a surface to which the conductive metal ink is applied; and d) thermally treating the conductive nanowire layer to electrically bridge the conductive nanowires with each other by conductive metal particles of the conductive metal ink.

Hereinafter, specific constitutions of the first and second examples will be described in detail. A layer coated with a conductive metal ink solution is referred to as a conductive metal ink layer, and a transparent conductive layer includes a conductive nanowire layer and a conductive metal ink layer.

As the base material, various kinds of substrate may be used as long as the material is easily thinned or patterned by a coating or a printing process.

As one example of the base material, a transparent plastic film such as polyimide (PI), polyethyleneterephthalate (PET), polyethylenenaphthalate (PEN), polyethersulfone (PES), nylon, polytetrafluoroethylene (PTFE), polyetheretherketone (PEEK), polycarbonate (PC), polyarylate (PAR), or the like, or a glass substrate may be used.

However, the base material is not limited thereto.

The conductive nanowire layer may be coated with a conductive nanowire solution containing a conductive nanowire and a solvent.

More specifically, in the case in which the conductive nanowire solution contains the conductive nanowire and the solvent, the conductive nanowire solution may contain 0.01 to 10 wt % of the conductive nanowire and 90 to 99.9 wt % of the solvent, that is, the conductive nanowire solution may contain 0.01 to 10 wt % of the conductive nanowire.

The conductive nanowire may be a metal nanowire, a metal nanorod, an electrically conductive fiber or a carbon nanotube (CNT).

The metal nanowire may have an average thickness of 50 to 150 nm and an average length of 1 to 100 μm, and the carbon nanotube may have an average diameter of 1.2 to 20 nm and an average length of 0.5 to 100 μm.

As the metal nanowire, various kinds of metal nanowires such as a silver nanowire, a gold nanowire, a gold-silver alloy nanowire, a copper nanowire, and the like, which are known in the art, may be used.

For example, the silver nanowire having excellent conductivity, cheap cost, and being capable of being mass-produced as compared to other nanowires may be used. Silver, a main material of the silver nanowire, is a basically opaque material, but silver in a nano-unit size has a transparency. In addition, with respect to conductivity, when the size of silver is less than a predetermined size, specific resistance may be rapidly increased, such that the preferred average thickness may be 50 to 150 nm, and the preferred average length may be 1 to 100 μm.

The silver nanowire may be manufactured by using a polyol reduction method in which silver nitrate and polyvinylpyrrolidone is dissolved into a solvent such as ethyleneglycol, followed by heating and stirring, to be reduced, but a method of manufacturing silver nanowire is not limited thereto.

An example of the solvent may include alcohols such as water, methanol, ethanol, isopropanol, 1-methoxy propanol, butanol, ethylhexyl alcohol, and terpineol, glycols such as ethyleneglycol and glycerin, acetates such as ethylacetate, butylacetate, methoxypropylacetate carbitolacetate, and ethylcarbitolacetate, ethers such as methyl cellosolve, butyl cellosolve, diethyl ether, tetrahydrofuran, and dioxane, ketones such as methylethylketone, acetone, dimethylformamide, and 1-methyl-2-pyrrolidone, hydrocarbon-based solvents such as hexane, heptane, dodecane, a paraffin oil, and a mineral spirit, aromatic hydrocarbon-based solvents such as benzene, toluene and xylene, halogen substituted solvents such as chloroform, methylene chloride, and carbon tetrachloride, and acetonitrile, dimethyl sulfoxide, or a mixed solvent thereof.

The conductive nanowire solvent may further contain at least one kind of additional additives selected from a group consisting of a binder, a dispersant, a stabilizer, a thin film assistant, a binder resin, a surfactant, a wetting agent, a thixotropic agent, a leveling agent, and a reducing agent.

In the case in which the conductive nanowire solution further contains additional additives, the additives may be added in an amount of 0.01 wt % to 5 wt %. In this case, the conductive nanowire solution may contain 0.01 to 10 wt % of the conductive nanowire, 85 to 99 wt % of the solvent, and 0.01 to 5 wt % of the additional additive.

An example of the binders may include a mixture of ethylhydroxylethylcellulose and an acrylic acid-acrylamide copolymer and a mixture of polyethylene oxide and polyvinyl alcohol, an acrylic acid-methacrylic acid copolymer, an acrylic acid ester-methacrylic acid ester copolymer, an acrylic acid-acrylamide copolymer, and a mixture of an acrylic acid-acrylamide copolymer and polyethylene oxide.

As the dispersant, an organic compound such as a polycarboxylic acid or a derivative thereof may be mainly used. An example of the polycarboxylic acids or derivatives thereof may include homopolymers and copolymers of acrylic acid salts or methacylic acid salts such as alkalimetal salts of an acrylic acid or a methacrylic acid, homopolymers and copolymers of acrylic acid esters or methacrylic acid esters such as methyl acrylate, methyl methacrylate, ethyl acrylate, ethyl methacrylate, n-butyl acrylate, n-butyl methacrylate, isobutyl acrylate or isobutyl methacrylate. However, the present invention is not limited thereto.

The conductive nanowire layer is coated with the conductive nanowire solution, wherein the coating method may be selected from a group consisting of spin coating, roll coating, spray coating, dip coating, flow coating, doctor blade, dispensing, ink-jet printing, offset printing, screen printing, pad printing, gravure printing, flexography printing, stencil printing, imprinting, xerography, and lithography.

The conductive metal ink coating layer may be coated with a conductive metal ink solution containing the conductive metal ink and the solvent for providing the conductive metal particles that bridge the conductive nanowires.

More specifically, in the case in which the conductive metal ink solution contains the conductive metal ink and the solvent, the conductive metal ink solution may contain 0.01 to 10 wt % of the conductive metal ink and 90 to 99.9 wt % of the solvent, that is, the conductive metal ink solution may contain 0.01 to 10 wt % of the conductive metal ink.

An example of the solvent may include alcohols such as water, methanol, ethanol, isopropanol, 1-methoxy propanol, butanol, ethylhexyl alcohol, and terpineol, glycols such as ethyleneglycol and glycerin, acetates such as ethylacetate, butylacetate, methoxypropylacetate, carbitolacetate, and ethylcarbitolacetate, ethers such as methyl cellosolve, butyl cellosolve, diethyl ether, tetrahydrofuran, and dioxane, ketones such as methylethylketone, acetone, dimethylformamide, and 1-methyl-2-pyrrolidone, hydrocarbon-based solvents such as hexane, heptane, dodecane, a paraffin oil, and a mineral spirit, aromatic hydrocarbon-based solvents such as benzene, toluene and xylene, halogen substituted solvents such as chloroform, methylene chloride, and carbon tetrachloride, and acetonitrile, dimethyl sulfoxide, or a mixed solvent thereof.

The conductive metal ink solution may further contain at least one kind of additional additives selected from a group consisting of a binder, a dispersant, a stabilizer, a thin film assistant, a binder resin, a surfactant, a wetting agent, a thixotropic agent, a leveling agent, and a reducing agent.

In the case in which the conductive metal ink solution further contains additional additives, the additives may be added in an amount of 0.01 wt % to 5 wt %. In this case, the conductive metal ink solution may contain 0.01 to 10 wt % of the conductive metal ink, 85 to 99 wt % of the solvent, and 0.01 to 5 wt % of the additional additive.

An example of the binders may include a mixture of ethylhydroxyethylcellulose and an acrylic acid-acrylamide copolymer and a mixture of polyethylene oxide and polyvinyl alcohol, an acrylic acid-methacrylic acid copolymer, an acrylic acid ester-methacrylic acid ester copolymer, an acrylic acid-acrylamide copolymer, and a mixture of an acrylic acid-acrylamide copolymer and polyethylene oxide.

As the dispersant, an organic compound such as a polycarboxilic acid or a derivative thereof may be mainly used. An example of the polycarboxylic acids or derivatives thereof may include homopolymers and copolymers of acrylic acid salts or methacylic acid salts such as alkalimetal salts of an acrylic acid or a methacrylic acid, homopolymers and copolymers of acrylic acid esters or methacrylic acid esters such as methyl acrylate, methyl methacrylate, ethyl acrylate, ethyl methacrylate, n-butyl acrylate, n-butyl methacrylate, isobutyl acrylate or isobutyl methacrylate. However, the present invention is not limited thereto.

Hereinafter, the conductive metal ink of the conductive metal ink solution will be described in detail.

The conductive metal ink of the conductive metal ink solution may contain a silver complex for forming the conductive metal particles, wherein the silver complex may be prepared by reacting at least one silver compound selected from the following Chemical Formula 1 and at least one ammonium carbamate-based compound or an ammonium carbonate-based compound selected from the following Chemical Formulas 2 to 4. The silver complex may be configured of silver and an ammonium carbamate-based compound or an ammonium carbonate-based compound.

$$Ag_nX \qquad \text{Chemical Formula 1}$$

(n is an integer of 1 to 4, and X is a substituent selected from a group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate, and a derivative thereof.)

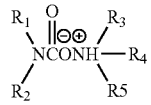

[Chemical Formula 2]

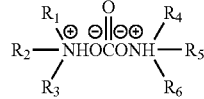

[Chemical Formula 3]

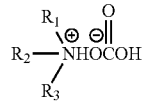

[Chemical Formula 4]

($R_1$, $R_2$, $R_3$, $R_4$, $R_5$, and $R_6$ are each independently a substituent selected from a group consisting of hydrogen, an aliphatic or cycloaliphatic (C1-C30) alkyl group, an aryl group, an aralkyl group, an (C1-C30) alkyl group substituted by a functional group, an aryl group substituted by a functional group, a polymer compound group, a hetero ring compound, and a derivative thereof, or $R_1$ and $R_2$, and $R_4$ and $R_5$ are each independently connected to alkylene with or without heteroatoms to form a ring.). Meanwhile, a case in which all of $R_1$ to $R_6$ are hydrogen may be excluded.

The silver compound represented by Chemical Formula 1 may be silver oxide, silver thiocyanate, silver sulfide, silver chloride, silver cyanide, silver cyanate, silver carbonate, silver nitrate, silver nitrite, silver sulfide, silver phosphorate, silver perchlorate, silver tetrafluoroborate, silver acetylacetonate, silver acetate, silver lactate, silver oxalate, and a derivative thereof, but is not limited thereto.

$R_1$ to $R_6$ may be selected from a group consisting of hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxy propyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl and a derivative thereof, and a polymer compound such as polyallylamine or polyethyleneimine and a derivative thereof, but is not limited thereto.

The ammonium carbamate-based compound represented by Chemical Formula 2 may be one or two or more kinds of mixtures selected from a group consisting of ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneimineammonium hexamethyleneiminecarbamate, morpholinium morpholinecarbamate, pyridinum ethylhexylcarbamate, triethylenediaminium isopropylbicarbamate, benzylammonium benzylcarbamate, triethoxysilylpropylammonium triethoxysilylpropylcarbamate, and a derivative thereof.

The ammonium carbonate-based compound represented by Chemical Formula 3 may be one or two or more kinds of mixtures selected from a group consisting of ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneimineammonium hexamethyleneiminecarbonate, morpholineammonium morpholinecarbonate, benzylammonium benzylcarbonate, triethoxysilylpropylammonium triethoxysilylpropylcarbonate, triethylenediaminium isopropylcarbonate and a derivative thereof.

The ammonium bicarbonate-based compound represented by Chemical Formula 4 may be one or two or more kinds of mixtures selected from a group consisting of ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and a derivative thereof.

Meanwhile, a kind of the ammonium carbamate-based compound, the ammonium carbonate-based compound, or the ammonium bicarbonate-based compound and a preparation method thereof are not specifically limited. For example, U.S. Pat. No. 4,542,214 (Sep. 17, 1985) discloses that the ammonium carbamate-based compound may be prepared from primary amine, secondary amine, tertiary amine or at least one mixture and carbon dioxide. Here, when 0.5 mole of water is added to one mole of amine to obtain the ammonium carbonate-based compound, and when 1 mole or more of water is added thereto, thereby obtaining the ammonium bicarbonate-based compound. The above-described preparation may be performed under normal pressure or applied pressure without a specific solvent, or in the presence of such solvent as water, alcohols like methanol, ethanol, isopropanol and butanol, glycols like ethylene glycol and glycerine, acetates like ethyl acetate, butyl acetate and carbitol acetate, ethers like diethyl ether, tetrahydrofuran and dioxane, ketones like methylethylketone and acetone, hydrocarbon-based solvents like hexane and heptane, aromatic hydrocarbon-based solvents like benzene and toluene, halogen-substituted solvents like chloroform, methylene chloride and carbon tetrachloride, or a mixed solvent thereof. The carbon dioxide may be bubbled in a gas phase or used in dry ice in solid phase, and reacted in a supercritical phase. As long as a structure of the finally prepared compound is the same as the structure of the prepared compound according to the present invention, any other known methods may be applied in the preparation of derivatives of the ammonium carbamate-based compound, the ammonium carbonate-based compound or the ammonium bicarbonate-based compound used in the present invention, in addition to the above-described method. That is, solvent, reaction temperature, concentration, catalyst, or the like, is not specifically limited in the preparation, and it does not matter to a preparation yield.

The ammonium carbamate-based or ammonium carbonate-based compound prepared as described above may be reacted with the silver compound to prepare an organic silver complex. For example, at least one silver compound represented by Chemical Formula 1 may be directly reacted with at least one ammonium carbamate-based or ammonium carbonate-based derivative represented by Chemical Formulas 2, 3 or 4, under nitrogen atmosphere at normal pressure or applied pressure without a solvent, or in the presence of such solvent as alcohols like methanol, ethanol, isopropanol and butanol, glycols like ethylene glycol and glycerine, acetates like ethyl acetate, butyl acetate and carbitol acetate, ethers like diethyl ether, tetrahydrofuran and dioxane, ketones like methylethylketone and acetone, hydrocarbons like hexane and heptane, aromatic solvents like benzene and toluene and halogen-substituted solvents like chloroform, methylene chloride and carbon tetrachloride, or the like. However, the preparation method of the organic silver complex compound is not particularly limited. That is, any known methods can be applied, as long as the final structure is the same. For example, it is not necessary to limit the solvent, reaction temperature, concentration, whether or not using catalyst, or the like, in the preparation, and it does not matter to the preparation yield.

In addition, in preparing the silver complex compound, the silver compound represented by the formula 1 and at least one amine compound are mixed together to prepare a solution, and the solution is reacted with carbon dioxide to obtain the silver complex compound. This reaction may also be performed under normal pressure or applied pressure without a solvent or in the presence of a solvent. However, the preparation method of the organic silver complex compound is not particularly limited. That is, any known methods can be applied, as long as the final structure is the same. For example, it is not necessary to limit solvent, reaction temperature, concentration, whether or not using catalyst, or the like, in the preparation, and it does not matter to, the preparation yield.

Meanwhile, the silver complex may be represented by the following Formula 5.

$$Ag[A]m \qquad \text{[Chemical Formula 5]}$$

In Chemical Formula 5, A is a compound represented by Chemical Formulas 2 to 4, and m is 0.7 to 2.5.

The silver complex may be dissolved into various solvents containing solvents preparing the organic silver complex of the present invention, including alcohols such as methanol, esters such ethyl acetate, ethers such as tetrahydrofuran. Therefore, the silver complex may be easily applied to an applying process or a printing process, and may be stably stored in a stable solution for 3 or more months.

In addition, the organic silver complex solution may be applied on substrates such as a glass, a silicon wafer, a polymer film such as polyester or polyimide, and the like, to prepare a thin film, or may be directly printed thereon.

The conductive metal ink may further contain a stabilizer, a thin film assistant, a solvent, a binder resin, a surfactant, a wetting agent, a dispersant, a thixotropic agent, a leveling agent, or a reducing agent as an additive, as needed.

An example of the stabilizers may include an amine compound such as primary amine, secondary amine, or tertiary amine, the ammonium carbamate-based compound, the ammonium carbonate-based compound, the ammonium bicarbonated-based compound, or a phosphorus compound such as phosphine, phosphite, or phosphate, a sulfide compound such as thiol or sulfide, and a mixture thereof.

More specifically, an example of the amine compounds may include methylamine, ethylamine, n-propylamine, isopropylamine, n-butylamine, isobutylamine, isoamylamine, n-hexylamine, 2-ethylhexylamine, n-heptylamine, n-octylamine, isooctylamine, nonylamine, decylamine, dodecylamine, hexadecylamine, octadecylamine, docodecylamine, cyclopropylamine, cyclopentylamine, cyclohexylamine, allylamine, hydroxyamine, ammoniumhydroxide, methoxyamine, 2-ethanolamine, methoxyethylamine, 2-hydroxy propylamine, 2-hydroxy-2-methylpropylamine, methoxypropylamine, cyanoethylamine, ethoxyamine, n-butoxyamine, 2-hexyloxyamine, methoxyethoxyethylamine, methoxyethoxyethoxyethylamine, diethylamine, dipropylamine, diethanolamine, hexamethyleneimine, morpholine, piperidine, piperazine, ethylenediamine, propylenediamine, hexamethylenediamine, triethylenediamine, 2,2-(ethylenedioxy)bisethylamine, triethylamine, triethanolamine, pyrrole, imidazole, pyridine, aminoacetaldehyde dimethylacetal, 3-aminopropyltrimethoxysilane, 3-aminopropyltriethoxysilane, aniline, anisidine, aminobenzonitrile, benzylamine and a derivative thereof, and a polymer compound such as polyallylamine or polyethylene imine and a derivative thereof.

An example of the ammonium carbamate-based compounds may include ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethylene imineammonium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate, and a derivative thereof.

An example of the ammonium carbonate-based compounds may include ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneimineammonium hexamethyleneiminecarbonate, morpholineammonium morpholinecarbonate, benzylammonium benzylcarbonate, triethoxysilylpropylammonium triethoxysilylpropylcarbonate, triethylenediaminium isopropylcarbonate and a derivative thereof.

An example of the ammonium bicarbonate-based compounds may include ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and a derivative thereof.

The phosphorus compound may be represented by Chemical Formula $R_3P$, $(RO)_3P$ or $(RO)_3PO$, wherein R is a C1~C20 alkyl group or aryl group. An example of the phosphorus compounds may include tributylphosphine, triphenylphosphine, triethylphosphite, triphenylphosphite, dibenzylphosphate, and triethylphosphate.

An example of the sulfur compounds may include butanethiol, n-hexanethiol, diethyl sulfide, tetrahydrothiophene, allyldisulfide, mercaptobenzothiazole, alkylmercaptoacetate, tetrahydrothiophene, octylthioglycolate, and the like.

A usage amount of the stabilizer is not specifically limited as long as the amount is sufficient for providing properties of an ink according to the present invention. However, it is preferred that a content of the stabilizer has a molar ratio of 0.1% to 90%, and more preferably, 1% to 50%, with respect to the silver compound. When the content is more than the above-described range, conductivity of the thin film may be decreased, and when the content is less than the above-described range, storage stability of the ink may be deteriorated.

As the thin film assistant, an organic acid and an organic acid derivative may be used, and one kind or two or more kinds of mixtures may be used.

An example of the organic acids may include an acetic acid, an oxalic acid, a citric acid, a lactic acid, a maleic acid, an acrylic acid, a butyric acid, a valeric acid, a pivalic acid, an n-hexanoic acid, a t-octanoic acid, a 2-2-ethyl-hexanoic acid, a neodecanoic acid, a lauric acid, a stearic acid, an oleic acid, a naphthenic acid, a dodecanoic acid and a linoleic acid.

An example of the organic acid derivatives may include ammonium organic acid salts such as ammonium acetate, ammonium citrate, ammonium laurate, ammonium lactate, ammonium malate, and ammonium oxalate, and organic acid metal salts containing metals such as Au, Cu, Zn, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Sm, Eu, Ac, and Th.

An example of the organic acid metal salts may include manganese oxalic acid, gold acetate, palladium oxalate, silver 2-ethylhexanoate, silver octanoate, silver neo-decanoic acid, cobalt stearic acid, nickel naphthenic acid, and cobalt naphthenic acid.

A usage amount of the thin film assistants is not specifically limited, but it is preferred that a content of the thin film assistant has a molar ratio of 0.1% to 25%, with respect to the silver complex or the mixture. When the content is more than the above-described range, it is difficult to form a uniform thin film and when the content is less than the above-described range, cracks may occur on the thin film.

In addition, if needed, the solvent may be used to control viscosity of the silver complex solution or may be used to smoothly form a thin film.

An example of the solvents may include alcohols such as methanol, ethanol, isopropanol, 1-methoxy propanol, butanol, ethylhexyl alcohol, and terpineol, glycols such as ethyleneglycol and glycerin, acetates such as ethylacetate, butylacetate, methoxypropylacetate, carbitolacetate, and ethylcarbitolacetate, ethers such as methyl cellosolve, butyl cellosolve, diethyl ether, tetrahydrofuran, and dioxane, ketones such as methylethylketone, acetone, dimethylformamide, and 1-methyl-2-pyrrolidone, hydrocarbon-based solvents such as hexane, heptane, dodecane, a paraffin oil, and a mineral spirit, aromatic hydrocarbon-based solvents such as benzene, toluene and xylene, halogen substituted solvents such as chloroform, methylene chloride, and carbon tetrachloride, and acetonitrile, dimethyl sulfoxide, or a mixed solvent thereof.

The binder resin may be an acryl-based resin such as a polyacrylic acid and polyacrylic acid ester, a cellulose-based resin such as ethyl cellulose, an aliphatic or copolymer polyester-based resin, a vinyl-based resin such as polyvinylbutyral and polyvinylacetate, a polyurethane resin, a polyether resin, a urea resin, an alkyd resin, a silicone resin, a fluorine resin, an olefin-based resin such as polyethylene, a thermoplastic resin such as petroleum and a rosin-based resin, an epoxy-based resin, an unsaturated polyester-based resin, a phenol-based resin, a thermosetting resin such as a melamine-based resin, an acryl-based resin hardened by a UV or electron beam, having various structures, ethylene-propylene-based rubber, styrene-butadiene-based rubber, or the like.

An example of the surfactants may include anionic surfactants such as sodium lauryl sulfate, non-ionic surfactants such as nonylphenoxypolyethoxyethanol and FSN of Dupont, cationic surfactants such as laurylbenzylammonium chloride or amphiphatic surfactants such as lauryl betaine and coco betaine.

An example of the wetting agents or the wetting dispersants may include polyethyleneglycol, surfynol series of Air Product, tego wet series of Degussa.

An example of the thixotropic agent or the leveling agent may include BYK series of BYK, glide series of Degussa, EFKA 3000 series of EFKA, and DSX series of Cognis.

The reducing agent may be added to easily perform a firing process. An example of the reducing agents may include hydrazine, acetic hydrazide, sodium or potassium borohydride, trisodium citrate, amine compounds such as methyl diethanolamine, dimethylamineborane, metal salts such as ferric chloride and ferric lactate, hydrogen, hydrogen iodide, carbon monoxide, aldehyde compounds such as formaldehyde and acetaldehyde, and organic compounds such as glucose, ascorbic acid, salicylic acid, tannic acid, pyrogallol, and hydroquinone.

Methods of forming the above-described silver complex and transparent silver ink are disclosed in Korean Patent Laid-Open Publication Nos. 10-2006-0011083 and 10-2005-0018364 filed by the present inventors.

As described above, the conductive metal ink containing the silver complex may be used as the conductive metal ink, wherein the transparent silver ink may be obtained by preparing the silver compound represented by Chemical Formula 1 and at least one amine compound in an excessive amount, or the ammonium carbamate-based compound or the ammonium carbonate-based compound, and a mixed solution thereof, and then adding the binder, the additive, or the like, thereto if needed, followed by reaction with carbon dioxide. The reaction may also be directly performed under normal pressure or applied pressure without a solvent or may be performed in the presence of a solvent.

More specifically, as the conductive metal ink, a transparent silver ink prepared by carbamate obtained by reacting 2-ethyl-1-hexylamine with carbon dioxide, or a transparent silver ink prepared by carbamate obtained by reacting 2-ethyl-1-hexylamine, isobutylamine mixed amine with carbon dioxide may be used.

As described above, the conductive metal ink containing the silver complex may be used as the conductive metal ink, wherein the conductive metal ink is not limited to a silver ink, but various kinds of metal inks may be used. In addition, the metal ink in which the conductive metal particles rather than the silver complex are separately grown and the grown conductive metal particles are dispersed may be used in the present invention.

The conductive metal ink layer may be coated with the conductive metal ink solution, wherein the coating method may be selected from a group consisting of spin coating, roll coating, spray coating, dip coating, flow coating, doctor blade, dispensing, ink-jet printing, offset printing, screen printing, pad printing, gravure printing, flexography printing, stencil printing, imprinting, xerography, and lithography.

After coating the conductive nanowire layer and the conductive metal ink layer, respectively, the coated conductive nanowire layer and the conductive metal ink layer may be thermally treated for 1 to 60 mins at 80 to 400° C., preferably, 90 to 300° C., more preferably, 100 to 250° C. Otherwise, the conductive nanowire layer and the conductive metal ink layer may be heated in two or more stages at a low temperature and a high temperature within the above-described range. For example, the heat treatment may be performed for 1 to 30 mins at 80 to 150° C. and for 1 to 30 mins at 150 to 300° C.

A phenomenon that the conductive nanowires are bridged with each other by the conductive metal particles is initiated from coating each layer, and in the thermal treatment, the bridge phenomenon of the conductive nanowires by the conductive metal particles is accelerated, such that a conductive net between the conductive nanowires may be continuously and firmly formed without being broken.

As described above, due to the bridge phenomenon which is initiated from coating each layer and accelerated in the thermal treatment, the conductive metal particles form a conductive dot which is an electrical point of contact between the conductive nanowires, such that the conductive net in which the conductive nanowires are electrically connected to each other through the conductive dot may be formed as shown in FIG. 1. Here, the conductive metal particle may have a size of 0.5 to 150 nm.

In the case of the conductive nanowire layer and the conductive metal ink coating layer, each one layer may be formed on a substrate, for example, may be formed in a sequence of the substrate, the conductive nanowire layer, and the conductive metal ink layer, or the substrate, the conductive metal ink layer, and the conductive nanowire layer, or the substrate, the conductive nanowire layer, the conductive nanowire layer, and the conductive metal ink layer, or the substrate, the conductive metal ink layer, the conductive metal ink layer, and the conductive nanowire layer, or the substrate, the conductive nanowire layer, the conductive nanowire layer, the conductive metal ink layer, and the conductive metal ink layer, or the substrate, the conductive metal ink layer, the conductive metal ink layer, the conductive nanowire layer, and the conductive nanowire layer. However, the layer constitution is not limited thereto, and the number of layers, the arrangement in layers, and concentration of solution forming each layer may be varied in a range at which transmittance and conductivity are capable of being secured.

Meanwhile, the method of manufacturing the transparent conductive layer according to the present invention may further include forming a protective layer by applying a solution for surface treatment on a surface of the transparent conductive layer. Due to the protective layer, oxidation may be prevented and adhesion may be improved.

The method of manufacturing the transparent conductive layer according to a third example of the present invention may include: a) forming a coating layer by coating a coating solution containing a conductive nanowire and a conductive metal ink on a base material; and b) thermally treating the coating layer to electrically bridge the conductive nanowires with each other by conductive metal particles of the conductive metal ink. Here, a specific description of the third example which has the same constitutions as the first example and the second example will be omitted.

The coating solution containing the conductive nanowire and the conductive metal ink may be prepared by mixing the conductive nanowire solution containing the conductive nanowire and the solvent and the conductive metal ink solution containing the conductive metal ink and the solvent.

Here, the conductive nanowire solution and the conductive metal ink solution may be prepared at a weight ratio of 1:1. One solution coating solution prepared by mixing two solutions as described above may form the transparent conductive layer.

The coating layer may be formed in one or more layers, for example, only one layer or two layers, but the number of layers is not limited thereto, and the number of layers and the concentration of the solution for forming the layer may be varied in a range at which transmittance and conductivity are capable of being secured.

Meanwhile, the transparent conductive layer according to the present invention may include the transparent conductive layer manufactured by the above-described manufacturing method.

In the transparent conductive layer, as shown in FIG. 1, the conductive metal particles forms the conductive dot which is the electrical point of contact between the conductive nanowires to be formed in the conductive net in which the conductive nanowires are electrically connected to each other through the conductive dot.

Hereinafter, the examples of the present invention have been described in detail, but the scope of the present invention is not limited thereto.

Preparation of Conductive Silver Nano Ink Solution

The conductive silver nano ink solution was prepared by using a mixture (containing 11.5 wt % of silver content and ethanol as solvent, Model No. TEC-R2A115 manufactured by InkTec Co., Ltd.) according to a composition as shown in the following Table 1. Here, 11.5 wt % of silver content means a silver content in TEC-R2A115 conductive silver nano ink, and Ag content means Ag content in the conductive silver nano ink solution prepared by mixing the conductive silver nano ink and ethanol as a solvent.

TABLE 1

<Preparation of Conductive Silver Nano Ink Solution>

| Serial No. | TEC-R2A115 (Ag Content: 11.5 wt %) | Ethanol | Ag Content (Wt %) |
|---|---|---|---|
| Ag Ink-1.5 | 13.04 gram | 86.96 gram | 1.50 |
| Ag Ink-1.0 | 8.70 gram | 91.30 gram | 1.00 |
| Ag Ink-0.5 | 4.35 gram | 95.65 gram | 0.50 |
| Ag Ink-0.25 | 2.17 gram | 97.83 gram | 0.25 |
| Ag Ink-0.05 | 0.43 gram | 99.57 gram | 0.05 |
| Ag Ink-0.01 | 0.09 gram | 99.91 gram | 0.01 |

Preparation of Conductive Silver NanoWire Solution>

A composition of the conductive silver nanowire solution is described in the following Table 2.

TABLE 2

<Composition of Conductive Silver NanoWire Solution>

| Serial No. | Silver NanoWire Content (wt %) | Solvent | Average Thickness of Silver Nanowire (Nanometer) | Average Length of Silver Nanowire (μm) |
|---|---|---|---|---|
| Ag-1.0-NWs | 1.0 | Ethanol | 100 | 50 |
| Ag-0.5-NWs | 0.5 | Ethanol | 100 | 50 |

Preparation of Conductive Carbon Nanotube Solution

A composition of the conductive carbon nanotube solution is described in the following Table 3.

TABLE 3

<Composition of Conductive Carbon Nanotube Solution>

| Serial No. | Solid Content (wt %) | Solvent | Average Thickness of CNT (Nanometer) | Average Length of CNT (μm) |
|---|---|---|---|---|
| CNT-1.0 | 1.0 | Ethanol | 1.5 | 5 |
| CNT-0.5 | 0.5 | Ethanol | 1.5 | 5 |

Preparation of Solution for Surface Treatment

A composition of the solution for surface treatment is described in the following Table 4.

TABLE 4

<Composition of Solution for Surface Treatment>

| Serial No. | Resin-based | Solvent | Final Solid Content (wt %) |
|---|---|---|---|
| Top-1 | Cellulose + Cymel-based | Isopropyl alcohol | 5 |
| Top-2 | Cellulose + Polyisocyanate-based | Isopropyl alcohol | 5 |
| Top-3 | Phenoxy + Cymel-based | Isopropyl alcohol | 5 |
| Top-4 | Polyurethane + Cymel-based | Isopropyl alcohol | 5 |
| Top-5 | Polyurea + Polyisocyanate-based | Isopropyl alcohol | 5 |
| Top-6 | Fatty acid-based | Isopropyl alcohol | 5 |

Example 1

Forming of Transparent Conductive Layer

Ag-1.0-NWs solution of Table 2 was dropped on an optical polyethylene terephthalate ((PET), trademark: SH40 manufactured by SKC, light transmittance: 92%) film and coated by using a spin coater, followed by thermal treatment for 5 min at 150° C., thereby forming a primary silver nanowire layer. The above-described process was repeated once to form a secondary silver nanowire layer.

Ag Ink-0.01 solution of Table 1 was dropped on the secondary silver nanowire layer and spin-coated, followed by thermal treatment for 5 min at 150° C., thereby forming a silver nano ink layer, wherein light transmittance was 89% and surface electrical resistance was 78Ω/□.

Example 2

Forming of Transparent Conductive Layer

Ag-1.0-NWs solution in Table 2 was dropped on polyethylene terephthalate ((PET), trademark: SH40 manufactured by SKC, light transmittance: 92%) film and coated by using a spin coater, followed by thermal treatment for 5 min at 150° C., thereby forming a primary silver nanowire layer. The above-described process was repeated once to form a secondary silver nanowire layer.

Ag Ink-0.05 solution of Table 1 was dropped on the secondary silver nanowire layer and spin-coated, followed by thermal treatment for 5 min at 150° C., thereby forming a silver nano ink layer, wherein light transmittance was 85% and surface electrical resistance was 30Ω/□.

Example 3

Forming of Transparent Conductive Layer

Ag-1.0-NWs solution in Table 2 was dropped on an optical polyethylene terephthalate ((PET), trademark: SH40 manufactured by SKC, light transmittance: 92%) film and coated by using a spin coater, followed by thermal treatment for 5 min at 150° C., thereby forming a primary silver nanowire layer. The above-described process was repeated once to form a secondary silver nanowire layer.

Ag Ink-0.01 solution of Table 1 was dropped on the secondary silver nanowire layer and spin-coated, followed by thermal treatment for 5 min at 150° C., thereby forming a primary silver nano ink layer, and the above-described process was repeated once to form a secondary silver nano ink layer. Here, light transmittance was 87% and surface electrical resistance was 45Ω/□.

Example 4

Forming of Transparent Conductive Layer

Ag-0.5-NWs solution in Table 2 was dropped on an optical polyethylene terephthalate ((PET), trademark: SH40 manufactured by SKC, light transmittance: 92%) film and coated by using a spin coater, followed by thermal treatment for 5 min at 150° C., thereby forming a primary silver nanowire layer. The above-described process was repeated once to form a secondary silver nanowire layer.

Ag Ink-0.05 solution of Table 1 was dropped on the secondary silver nanowire layer and spin-coated, followed by thermal treatment for 5 min at 150° C., thereby forming a primary silver nano ink layer, and the above-described process was repeated once to form a secondary silver nano ink layer. Here, light transmittance was 78% and surface electrical resistance was 20Ω/□.

Example 5

Forming of Transparent Conductive Layer

Ag-0.5-NWs solution in Table 2 was dropped on an optical polyethylene terephthalate ((PET), trademark: SH40 manufactured by SKC, light transmittance: 92%) film and coated by using a spin coater, followed by thermal treatment for 5 min at 150° C., thereby forming a primary silver nanowire layer. The above-described process was repeated twice to form secondary and tertiary silver nanowire layers.

Ag Ink-0.05 solution of Table 1 was dropped on the tertiary silver nanowire layer and spin-coated, followed by thermal treatment for 5 min at 150° C., thereby forming a silver nano ink layer. Here, light transmittance was 89% and surface electrical resistance was 23Ω/□.

Example 6

Forming of Transparent Conductive Layer

Ag Ink-0.05 solution of Table 1 and Ag-0.5-NWs solution of Table 2 were mixed at the same weight ratio and dropped on polyethylene terephthalate ((PET), trademark: SH40 manufactured by SKC, light transmittance: 92%) film and spin-coated, followed by thermal treatment for 5 min at 150° C., thereby forming a mixed layer of a primary silver nano ink and a silver nanowire.

The above-described process was repeated once to form the mixed layer of a secondary silver nano ink and the silver nanowire. Here, light transmittance was 83% and surface electrical resistance was 50Ω/□.

Example 7

Forming of Transparent Conductive Layer

Ag Ink-0.01 solution of Table 1 and Ag-1.0-NWs solution of Table 2 were mixed at the same weight ratio and dropped on polyethylene terephthalate ((PET), trademark: SH40 manufactured by SKC, light transmittance: 92%) film and spin-coated, followed by thermal treatment for 5 min at 150° C., thereby forming a mixed layer of a primary silver nano ink and the silver nanowire.

The above-described process was repeated once to form a mixed layer of a secondary silver nano ink and the silver nanowire. Here, light transmittance was 88% and surface electrical resistance was 42Ω/□.

Example 8

Forming of Transparent Conductive Layer

A CNT-1.0 solution of Table 3 was dropped on polyethylene terephthalate (PET), trademark: SH40 manufactured by SKC, light transmittance: 92%) film and coated by using a spin coater, followed by thermal treatment for 5 min at 150° C., thereby forming a carbon nanotube layer.

Ag Ink-0.5 solution of Table 1 was dropped on the carbon nanotube layer formed by repeating once the above-described process and spin-coated, followed by thermal treatment for 5 min at 150° C., thereby forming a silver nano ink layer. Here, light transmittance was 81% and surface electrical resistance was 74Ω/□.

Example 9

Forming of Transparent Conductive Layer

Ag-0.5-NWs solution of Table 2 and a CNT-0.5 solution of Table 3 were mixed at the same weight ratio and dropped on polyethylene terephthalate ((PET), trademark: SH40 manufactured by SKC, light transmittance: 92%) film and spin-coated, followed by thermal treatment for 5 min at 150° C., thereby forming a mixed layer of a primary carbon nanotube and a silver nanowire. The above-described process was repeated once to form a mixed layer of a secondary carbon nanotube and a silver nanowire.

Ag Ink-0.05 solution of Table 1 was spin-coated on the secondary mixed layer, followed by thermal treatment for 5 min at 150° C., thereby forming a silver nano ink layer, wherein light transmittance was 83% and surface electrical resistance was 79Ω/□.

Example 10

Forming of Transparent Conductive Layer

Ag Ink-0.05 solution of Table 1 and a CNT-1.0 solution of Table 3 were mixed at the same weight ratio and dropped on polyethylene terephthalate ((PET), trademark: SH40 manufactured by SKC, light transmittance: 92%) film and spin-coated, followed by thermal treatment for 5 min at 150° C., thereby forming a mixed layer of a primary carbon nanotube and a silver nanowire. The above-described process was repeated once to form a mixed layer of a secondary carbon nanotube and a silver nanowire.

Ag Ink-0.05 solution of Table 1 was dropped and spin-coated on the secondary mixed layer, followed by thermal treatment for 5 min at 150° C., thereby forming a silver nano ink layer, wherein light transmittance was 87% and surface electrical resistance was 89Ω/□.

Example 11

Forming of Protective Layer

A Top-1 solution of Table 4 was spin-coated on the transparent conductive layer of Example 1, followed by thermal treatment for 5 min at 150° C., thereby forming a polymer protective layer. In the finally formed transparent conductive layer, light transmittance was about 87% and surface electrical resistance was about 81Ω/□.

Example 12

Forming of Protective Layer

A Top-2, 3, and 4 solutions of Table 4 were spin-coated on the transparent conductive layer of Example 1, respectively, followed by thermal treatment for 5 min at 150° C., thereby forming each polymer protective layer. In each transparent conductive layer formed as described above, light transmittance was 87% and surface electrical resistance was about 81Ω/□.

Example 13

Forming of Protective Layer

A Top-5 solution of Table 4 was spin-coated on the transparent conductive layer of Example 1, followed by thermal treatment for 5 min at 150° C., thereby forming a polymer protective layer. In the finally formed transparent conductive layer, light transmittance was 83% and surface electrical resistance was about 81Ω/□.

Example 14

Forming of Protective Layer

A Top-6 solution of Table 4 was spin-coated on the transparent conductive layer of Example 1, followed by thermal treatment for 5 min at 150° C., thereby forming a polymer protective layer. In the finally formed transparent conductive layer, light transmittance was 81% and surface electrical resistance was about 81Ω/□.

Comparative Example 1

Ag Ink-1.5 solution of Table 1 was spin-coated on polyethylene terephthalate ((PET), trademark: SH40 manufactured by SKC, light transmittance: 92%) film, followed by thermal treatment for 5 min at 150° C., thereby forming a silver nano ink layer. Here, light transmittance was 40% and surface electrical resistance was 120Ω/□.

Comparative Example 2

Ag Ink-1.0 solution of Table 1 was spin-coated on polyethylene terephthalate ((PET), trademark: SH40 manufactured by SKC, light transmittance: 92%) film, followed by thermal treatment for 5 min at 150° C., thereby forming a silver nano ink layer. Here, light transmittance was 41% and surface electrical resistance was out of the measurement range.

Comparative Example 3

Ag-1.0-NWs solution of Table 2 was spin-coated on polyethylene terephthalate ((PET), trademark: SH40 manufactured by SKC, light transmittance: 92%) film, followed by thermal treatment for 5 min at 150° C., thereby forming a silver nanowire layer. Here, light transmittance was 89% and surface electrical resistance was 4548Ω/□.

Comparative Example 4

Ag-1.0-NWs solution of Table 2 was spin-coated on polyethylene terephthalate ((PET), trademark: SH40 manufactured by SKC, light transmittance: 92%) film, followed by thermal treatment for 5 min at 150° C., thereby forming a primary silver nanowire layer, and the above-described process was repeated once to form a secondary silver nanowire layer. Here, light transmittance was 87% and surface electrical resistance was 159Ω/□.

Values of light transmittance and surface resistance of the above-described Examples and Comparative Examples are shown in the following Table 5.

TABLE 5

| Example | Light Transmittance (%) | Surface Resistance (Ω/□) |
| --- | --- | --- |
| Example 1 | 89 | 78 |
| Example 2 | 85 | 30 |
| Example 3 | 87 | 45 |
| Example 4 | 78 | 20 |
| Example 5 | 89 | 23 |
| Example 6 | 83 | 50 |
| Example 7 | 88 | 42 |
| Example 8 | 81 | 74 |
| Example 9 | 83 | 79 |
| Example 10 | 87 | 89 |
| Example 11 | 87 | 81 |
| Example 12 | 87 | 81 |
| Example 13 | 83 | 81 |
| Example 14 | 81 | 81 |
| Comparative Example 1 | 40 | 120 |
| Comparative Example 2 | 41 | Cannot be Measured |
| Comparative Example 3 | 89 | 4548 |
| Comparative Example 4 | 87 | 159 |

It may be appreciated from Table 5 above that Examples 1 to 14 had excellent light transmittance and surface resistance which may be used as a transparent electrode, whereas Comparative Examples 1 to 4 had poor light transmittance and surface resistance which may not be satisfied as the transparent electrode.

According to the present invention as described above, in the case in which a number of layers are formed by decreasing concentration of the conductive metal ink, the light transmittance may be improved, and the conductive nanowires are bridged with each other by the conductive metal particles to form a conductive net, thereby improving the conductivity. Therefore, even though the concentration of the conductive nanowires is not increased, high conductivity may be provided and the concentration of the conductive nanowires may be substantially decreased to reduce the haze.

INDUSTRIAL APPLICABILITY

According to the present invention, there is provided a method of manufacturing a transparent conductive layer having excellent conductivity, transmittance, flexibility, and adhesion, and low haze by simple process, and a transparent conductive layer manufactured by the same.

The invention claimed is:

1. A method of manufacturing a transparent conductive layer, the method comprising:
    a) forming a conductive nanowire layer on a base material;
    b) thermally treating the conductive nanowire layer;
    c) applying a conductive metal ink on the conductive nanowire layer; and
    d) subsequently thermally treating the base material applied with the conductive metal ink to electrically bridge the conductive nanowires with each other by conductive metal particles formed from the conductive metal ink,
    wherein the conductive metal ink is a conductive metal ink solution containing a silver complex prepared by reacting at least one silver compound selected from the following Chemical Formula 1 and at least one ammonium carbamate-based compound or ammonium carbonate-based compound selected from the following Chemical Formulas 2 to 4:

$$Ag_nX \quad \text{(Chemical Formula 1)}$$

(n is an integer of 1 to 4, and X is a substituent selected from a group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate, and a derivative thereof)

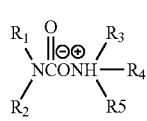
(Chemical Formula 2)

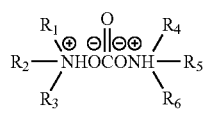
(Chemical Formula 3)

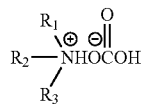
(Chemical Formula 4)

(R1, R2, R3, R4, R5, and R6 are each independently a substituent selected from a group consisting of hydrogen, an aliphatic or cycloaliphatic (C1-C30) alkyl group, an aryl group, an aralkyl group, an (C1-C30) alkyl group substituted by a functional group, an aryl group substituted by a functional group, a polymer compound group, a hetero ring compound, and a derivative thereof, or R1 and R2, and R4 and R5 are each independently connected to alkylene with or without heteroatoms to form a ring).

2. The method of claim 1, wherein in the bridging of the conductive nanowires with each other by the conductive metal particles, the conductive metal particles form a conductive dot which is an electrical point of contact between the conductive nanowires to be formed in a conductive net in which the conductive nanowires are electrically connected to each other through the conductive dot.

3. The method of claim 1, wherein the base material is polyimide (PI), polyethyleneterephthalate (PET), polyethylenenaphthalate (PEN), polyethersulfone (PES), nylon, polytetrafluoroethylene (PTFE), polyetheretherketone (PEEK), polycarbonate (PC), polyarylate (PAR) or a glass.

4. The method of claim 1, wherein the conductive nanowire is a metal nanowire, a metal nanorod, an electrically conductive fiber or a carbon nanotube (CNT).

5. The method of claim 4, wherein the metal nanowire has an average thickness of 50 to 150 nm and an average length of 1 to 100 μm.

6. The method of claim 4, wherein the carbon nanotube has an average diameter of 1.2 to 20 nm and an average length of 0.5 to 100 μm.

7. The method of claim 1, wherein the conductive metal particle has a size of 0.5 to 150 nm.

8. The method of claim 1, wherein the forming of the conductive nanowire layer and application of the conductive metal ink are done by a coating process selected from the group consisting of spin coating, roll coating, spray coating, dip coating, flow coating, doctor blade and dispensing, inkjet printing, offset printing, screen printing, pad printing, gravure printing, flexography printing, stencil printing, imprinting, xerography, and lithography.

9. The method of claim 1, wherein at least one of the thermal treatment of step b) and the thermal treatment of step d) independently is performed for 1 to 60 mins at a temperature of 100 to 250° C.

10. The method of claim 1, further comprising forming a protective layer by applying a solution for surface treatment thereon.

11. The method of claim 1, wherein the forming of the conductive nanowire layer is performed by coating with a conductive nanowire solution containing the conductive nanowire and a solvent.

12. The method of claim 11, wherein the conductive nanowire solution contains 0.01 to 10 wt % of the conductive nanowire.

13. The method of claim 11, wherein the conductive nanowire solution further contains at least one kind of additional additives selected from a group consisting of a binder, a dispersant, a stabilizer, a thin film assistant, a binder resin, a surfactant, a wetting agent, a thixotropic agent, a leveling agent, and a reducing agent.

14. The method of claim 11, wherein the solvent is at least one kind selected from a group consisting of water, methanol, ethanol, isopropanol, 1-methoxypropanol, butanol, ethylhexyl alcohol, terpineol, ethyleneglycol, glycerin, ethylacetate, butylacetate, methoxypropylacetate, carbitolacetate, ethylcarbitolacetate, methylcellosolve, butylcellosolve, diethylether, tetrahydrofuran, dioxane, methylethylketone, acetone, dimethylformamide, 1-methyl-2-pyrrolidone, hexane, heptane, dodecane, a paraffin oil, mineral spirit, benzene, toluene, xylene, chloroform, methylenechloride, carbontetrachloride, acetonitrile and dimethylsulfoxide.

15. The method of claim 1, wherein the application of the conductive metal ink coating layer is performed by coating with a conductive metal ink solution containing the conductive metal ink and a solvent.

16. The method of claim 15, wherein the conductive metal ink solution contains 0.01 to 10 wt % of the conductive metal ink.

17. The method of claim 15, wherein the conductive metal ink solution further contains at least one kind of additional additives selected from a group consisting of a binder, a dispersant, a stabilizer, a thin film assistant, a binder resin, a surfactant, a wetting agent, a thixotropic agent, a leveling agent, and a reducing agent.

18. The method of claim 15, wherein the solvent is at least one kind selected from a group consisting of water, methanol, ethanol, isopropanol, 1-methoxypropanol, butanol, ethylhexyl alcohol, terpineol, ethyleneglycol, glycerin, ethylacetate, butylacetate, methoxypropylacetate, carbitolacetate, ethylcarbitolacetate, methylcellosolve, butylcellosolve, diethylether, tetrahydrofuran, dioxane, methylethylketone, acetone, dimethylformamide, 1-methyl-2-pyrrolidone, hexane, heptane, dodecane, a paraffin oil, mineral spirit, benzene, toluene, xylene, chloroform, methylenechloride, carbontetrachloride, acetonitrile and dimethylsulfoxide.

19. The method of claim 1 further comprising at least one of repeating steps a) and b) one or more times before step c) and repeating steps c) and d) one or more times.

* * * * *